(12) United States Patent
Scherl et al.

(10) Patent No.: US 6,465,036 B1
(45) Date of Patent: Oct. 15, 2002

(54) FOOD EMULSION CONTAINING AN EMULSIFIER FROM SORBITAN

(75) Inventors: Franz Xaver Scherl, Burgkirchen; Angelika Turowski-Wanke, Kelkheim; Tanja Fisch, Burgkirchen, all of (DE)

(73) Assignee: Clariant GmbH, Frankfurt (DE)

( * ) Notice: Subject to any disclaimer, the term of this patent is extended or adjusted under 35 U.S.C. 154(b) by 4 days.

(21) Appl. No.: 09/722,783

(22) Filed: Nov. 27, 2000

(30) Foreign Application Priority Data

Nov. 27, 1999 (DE) .......................... 199 57 246

(51) Int. Cl.⁷ .............................. A23D 7/005
(52) U.S. Cl. ...................... 426/604; 426/611
(58) Field of Search ................ 426/602, 603, 426/611, 604

(56) References Cited

U.S. PATENT DOCUMENTS

| | | |
|---|---|---|
| 4,312,777 A | 1/1982 | Kawano et al. |
| 4,794,015 A | 12/1988 | Fujita et al. |
| 5,683,738 A | 11/1997 | Gruetzmacher et al. |
| 6,107,500 A | 8/2000 | Prossel et al. |

FOREIGN PATENT DOCUMENTS

| | | |
|---|---|---|
| DE | 1 442 001 | 11/1968 |
| DE | 23 39 149 | 2/1975 |
| DE | 29 50 917 | 7/1980 |
| DE | 197 27 950 | 1/1999 |
| DE | 199 06 368 | 8/2000 |
| EP | 0 254 376 | 1/1988 |
| WO | WO 93/00016 | 1/1993 |

OTHER PUBLICATIONS

21 CFR Ch–1, Part 166, pp. 406–408 Apr. 1, 1987 edition.*
EPO Search Report.
Derwent Patent Family Abstract for DE 1 442 001.
Derwent Patent Family Abstract for DE 23 39 149.
U.S. Patent Application 09/505,293 (Attorney Docket No. 1999DE407).

* cited by examiner

Primary Examiner—Carolyn Paden
(74) Attorney, Agent, or Firm—Richard P. Silverman

(57) ABSTRACT

This type of foods, in particular margarine, comprises, as emulsifier, reaction products of sorbitol with triglycerides.

4 Claims, No Drawings

FOOD EMULSION CONTAINING AN EMULSIFIER FROM SORBITAN

BACKGROUND OF THE INVENTION (1) Field of the Invention

The invention relates to the use of sorbitol esters of fatty acids, in particular sorbitol esters based on rapeseed oil, in foods as flavor-neutral emulsifier having a very effective action on the reduction of surface tension of both polar and nonpolar liquids and high stability even under temperature stress and at low concentrations in use. The inventive low-melting emulsifiers based on renewable raw materials exhibit outstanding hydrophilic and hydrophobic properties which cause good emulsifying action in water-in-oil emulsions.

(2) Description of the Related Art

DE 29 50 917 describes the use of polyoxyethylenesorbitol esters of fatty acids, in which at least two hydroxyl groups of the sorbitol are esterified, as W/O emulsifiers.

DE 2 339 149 describes the use of partial esters of sorbitol with alpha-branched monocarboxylic acids, the sorbitol hydroxyl groups being from 50 to 90% esterified, as W/O emulsifiers in cosmetic preparations.

DE 197 27 950 describes the preparation of mixtures which for the most part consist of sorbitol monoesters, sorbitol diesters and partial glycerides.

EP 254 376 claims a process for preparing partial polyhydroxy esters of fatty acids from sugar alcohols and $C_8$–$C_{22}$ fatty acid alkyl esters and their use as emulsifier in cosmetic and pharmaceutical products, and in foods.

The application DE 199 06 368.0 states that the mixture of esters described in

DE 197 27 950 can be used as emulsifier for cosmetic and pharmaceutical preparations.

SUMMARY OF THE INVENTION

The present invention relates to foods in the form of oil-in-water or water-in-oil emulsions which comprise, as emulsifiers, a reaction product of sorbitol and triglycerides.

DESCRIPTION OF THE PREFERRED EMBODIMENTS

The inventively used emulsifiers are prepared by reacting sorbitol with methyl esters of fatty acids or fatty acid triglycerides corresponding to the process described in DE 197 27 950, in which, as catalysts, here at any rate, customary alkaline catalysts, in particular sodium methoxide, are used. The fatty acid radical in the methyl esters of fatty acids and fatty acid triglycerides generally contains 8 to 22 carbons and can be unbranched or branched, saturated or unsaturated. Fatty acid triglycerides which are suitable are all native animal or vegetable oils, fats and waxes, for example olive oil, rapeseed oil, palm kernel oil, sunflower seed oil, coconut oil, linseed oil, castor bean oil, soybean oil, if appropriate also in refined or hydrated form. Since these natural fats, oils and waxes are usually mixtures of fatty acids of different chain lengths, this also applies to fatty acid radicals in the inventive emulsifiers. Particular preference is given to the use of rapeseed oil, where the rapeseed oil has only low erucic acid contents.

The reaction of sorbitol with the fatty acid triglycerides or methyl esters of fatty acids takes place in a one-pot process without solvent at temperatures of approximately 120–140° C. in the presence of an alkaline catalyst. The reaction time is generally 12 to 13 hours. Since sorbitol is customarily commercially available as an aqueous solution, the water must firstly be removed. This is performed by distillation under reduced pressure at a maximum of 120° C. The molar ratio of sorbitol to fatty acid triglycerides is generally 1:4.5, preferably 1:3.5 to 1:4.5.

The reaction products can also be alkoxylated, preferably ethoxylated; the ethoxylated group content can be from 1 to 90—$CH_2CH_2O$ groups per molecule of sorbitol. The alkoxylated groups can be introduced via an alkoxylation of the sorbitol by methods known per se prior to the transesterification reaction.

Owing to the use of fatty acid triglycerides as starting product, the reaction product also still contains mono- and di-fatty acid glyceride and unreacted triglyceride depending on the molar ratio of the starting compounds selected in each case.

The resultant mixture of the different reaction products is very suitable as an emulsifier for all types of foods which are present as emulsions, both of the oil-in-water and the water-in-oil type, in particular for the production of margarine. The amount of the inventive transesterification products as emulsifier in these emulsions is generally from 0.1 to 8, preferably from 0.3 to 5, in particular from 0.5 to 4, % by weight, based on the foods.

EXAMPLES

Sorbitol Ester 1

1 mol of sorbitol was charged in the form of a 70% strength sorbitol syrup and the water was distilled off in a water-jet vacuum at 120° C. After adding 1% by weight (based on the total amount weighed out) of potassium carbonate (30% strength in water) at 80° C., the water was distilled off under a full water-jet vacuum. 4 mol of refined rapeseed oil were then added and the mixture was stirred for 8 hours at 140° C.

Sorbitol Ester 2

1 mol of sorbitol was charged in the form of a 70% strength sorbitol syrup and the water was distilled off at 120° C. in a water-jet vacuum. 1% by weight (based on the entire amount weighed out) of $NaOCH_3$ (30% strength in methanol) was then added at 80° C. and the methanol was distilled off under a full water-jet vacuum. 2 mol of methyl laurate were then added and the mixture was heated for 1 hour at 140° C. under nitrogen and for a further 12 hours at 140° C. at a full water-jet vacuum. The resultant methanol was distilled off.

Sorbitol Ester 3

The procedure was as for sorbitol ester 2. The transesterification was performed by heating for 11 hours at 140° C. with 1 mol of methyl palmitate.

A margarine of the following composition was produced: 78% by weight of sunflower seed oil, 2% by weight of each of the sorbitol esters 1, 2 or 3 and 20% by weight of water. The production was performed according to known processes by emulsifying the three components, subcooling and crystallizing.

What is claimed is:

1. A food in the form of a oil-in-water or water-in-oil emulsion which comprises a reaction product of a sorbitol with triglycerides and/or methyl esters of fatty acids as an emulsifier, said food having from 0.1 to 8% by weight of the emulsifier.

2. The food as claimed in claim 1, wherein the emulsifier comprises the reaction product of sorbitol and rapeseed oil.

3. The food as claimed in claim 1, which is margarine.

4. A margarine comprising the emulsifier of claim 1.

* * * * *